United States Patent
Kight et al.

(10) Patent No.: US 10,927,746 B2
(45) Date of Patent: Feb. 23, 2021

(54) SYSTEM AND METHOD FOR A VARIABLE SPEED COOLING FAN ON A SKID MOUNTED COMPRESSOR

(71) Applicant: ALFA LAVAL CORPORATE AB, Lund (SE)

(72) Inventors: Rusty Kight, Coweta, OK (US); Blake Minton, Broken Arrow, OK (US); Chris Jungers, Tulsa, OK (US)

(73) Assignee: ALFA LAVAL CORPORATE AB, Lund (SE)

( * ) Notice: Subject to any disclaimer, the term of this patent is extended or adjusted under 35 U.S.C. 154(b) by 149 days.

(21) Appl. No.: 16/081,392

(22) PCT Filed: Mar. 17, 2017

(86) PCT No.: PCT/EP2017/056332
§ 371 (c)(1),
(2) Date: Aug. 30, 2018

(87) PCT Pub. No.: WO2017/158137
PCT Pub. Date: Sep. 21, 2017

(65) Prior Publication Data
US 2020/0173340 A1    Jun. 4, 2020

Related U.S. Application Data

(63) Continuation of application No. 15/074,299, filed on Mar. 18, 2016, now abandoned.

(51) Int. Cl.
*F01P 7/04*    (2006.01)
*F04D 29/58*    (2006.01)
(Continued)

(52) U.S. Cl.
CPC ............ *F01P 7/048* (2013.01); *F01P 5/04* (2013.01); *F04B 35/002* (2013.01); *F04D 17/12* (2013.01);
(Continued)

(58) Field of Classification Search
CPC . F01P 7/048; F01P 5/04; H02D 15/00; H02K 49/04; F04D 19/002; F04D 25/16; F04D 25/02; F04D 35/002; F04D 27/004
See application file for complete search history.

(56) References Cited

U.S. PATENT DOCUMENTS 4,124,001 A    11/1978    Samuel et al.
4,228,691 A    10/1980    Smirl
(Continued)

FOREIGN PATENT DOCUMENTS

CN    203081761 U    7/2013

OTHER PUBLICATIONS

Written Opinion of the International Searching Authority dated Oct. 7, 2017 issued by the European Patent Office in corresponding PCT Application No. PCT/EP2017/056332 (6 pages).
(Continued)

*Primary Examiner* — Charles G Freay
(74) *Attorney, Agent, or Firm* — Buchanan Ingersoll & Rooney PC

(57) ABSTRACT

A system and method of a variable speed cooling fan (30) for a skid mounted compressor (22). A magnetic variable speed clutch (38) is mounted to the cooling fan drive shaft (28). The clutch mechanism is driven via by a drive pulley (38) on the crankshaft of the engine (24) driving the compressor (22). The speed of the fan (30) is varied dependent upon the temperature of the fluids being cooled.

18 Claims, 3 Drawing Sheets

(51) Int. Cl.
*F04D 17/12* (2006.01)
*F04D 27/00* (2006.01)
*F04D 25/02* (2006.01)
*F04D 25/04* (2006.01)
*F04D 25/16* (2006.01)
*F01P 5/04* (2006.01)
*F04B 35/00* (2006.01)
*F04D 19/00* (2006.01)
*H02K 49/04* (2006.01)
*H02P 15/00* (2006.01)

(52) U.S. Cl.
CPC .......... *F04D 19/002* (2013.01); *F04D 25/02* (2013.01); *F04D 25/022* (2013.01); *F04D 25/026* (2013.01); *F04D 25/04* (2013.01); *F04D 25/16* (2013.01); *F04D 25/166* (2013.01); *F04D 27/004* (2013.01); *F04D 29/584* (2013.01); *F04D 29/5826* (2013.01); *H02K 49/04* (2013.01); *H02P 15/00* (2013.01)

(56) References Cited

U.S. PATENT DOCUMENTS

| | | | |
|---|---|---|---|
| 4,376,424 A * | 3/1983 | Mazur | F01P 5/04 123/41.12 |
| 4,955,431 A * | 9/1990 | Saur | F01P 7/04 123/41.12 |
| 5,362,207 A * | 11/1994 | Martin | F04D 25/02 165/140 |
| 5,873,708 A | 2/1999 | Delhomme, II et al. | |
| 6,129,193 A | 10/2000 | Link | |
| 6,176,690 B1 | 1/2001 | Knepp | |
| 6,682,430 B2 | 1/2004 | Killen | |
| 7,294,947 B2 | 11/2007 | Corbin, III et al. | |
| 7,341,026 B2 | 3/2008 | Laukemann | |
| 7,686,146 B2 * | 3/2010 | Taylor | B60H 1/038 123/142.5 R |
| 9,165,514 B2 | 10/2015 | Choi et al. | |
| 9,394,906 B2 | 7/2016 | Fujimoto et al. | |
| 2004/0011306 A1 | 1/2004 | Liederman et al. | |
| 2018/0371981 A1 | 12/2018 | Kight et al. | |

OTHER PUBLICATIONS

International Search Report dated Oct. 7, 2017 issued by the European Patent Office in corresponding PCT Application No. PCT/EP2017/056332 (5 pages).

U.S. Official Action dated Nov. 15, 2019 issued in corresponding U.S Appl. No. 16/119,271 by the U.S. Patent and Trademark Office (14 pages).

* cited by examiner

SYSTEM AND METHOD FOR A VARIABLE SPEED COOLING FAN ON A SKID MOUNTED COMPRESSOR

FIELD OF THE INVENTION

The present invention relates generally to a system and method for driving a fin fan cooler. More particularly, the present invention relates to a system and method for driving variable speed fan in a fin fan cooler with an internal combustion engine on a skid mounted compressor.

BACKGROUND OF THE INVENTION

Skid mounted compressors are commonly used on well sites for compressing natural gas so it can be shipped via a pipeline. The skids typically have an internal combustion engine which is fueled by a small portion of the natural gas being produced. These skids typically have a fin fan heat exchanger used to cool the engine and natural gas between compression stages. The fin fan heat exchanger has a fan which pushes or pulls ambient air across the heat exchanger to remove heat from the compressed gas and engine coolant. The fan is typically being driven via belt directly off of the crank shaft of the engine without the ability to independently adjust the fan speed. This puts additional load on the engine leading to additional fuel consumption and additional heat from the engine.

These skid assemblies must operate in extreme conditions including temperatures in excess of 100° F. Thus the heat exchangers and fan speed must be designed to operate at this extremely high temperature. While the skid must be capable of operating at this extreme temperature, it typically only operates at that temperature for a few days every year. Even on those days where the temperature exceeds 100° F., it only does so for a few hours. Thus these skids have traditionally operated 24 hours a day, 365 days a year at fan speeds which are only needed for a few hours in the afternoon of the hottest days of the year. This excess fan speed leads to extraordinary additional fuel consumption and costs of the course of a year.

Some attempts have been made to provide an adjustable cooling fan speed on a compressor skid. These have been limited to using a hydrostatic clutch mechanism. These required additional gearing and drive mechanisms. Further they do not allow for the direct drive of the cooling fan in an efficient manner. The complexity and expense of these drives have led to few installations in the industry.

What is needed, therefore, is a simple and efficient system and method to provide a variable speed cooling fan on a gas compressor skid for use on a wellsite.

BRIEF SUMMARY OF THE INVENTION

The present invention achieves its objections by providing a simple and efficient variable speed cooling fan for a skid mounted compressor. The present invention uses a magnetic variable speed clutch mounted to the cooling fan drive shaft. The clutch mechanism is driven via by a drive pulley on the crankshaft of the engine driving the compressor. The speed of the fan is varied through operation of the magnetic variable speed clutch dependent upon the temperature of the fluids being cooled.

Thus the present invention provides a system and method for reducing the fan speed to the lowest necessary level. This reduces fuel usage and operating costs.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENT(S)

Figure 1:
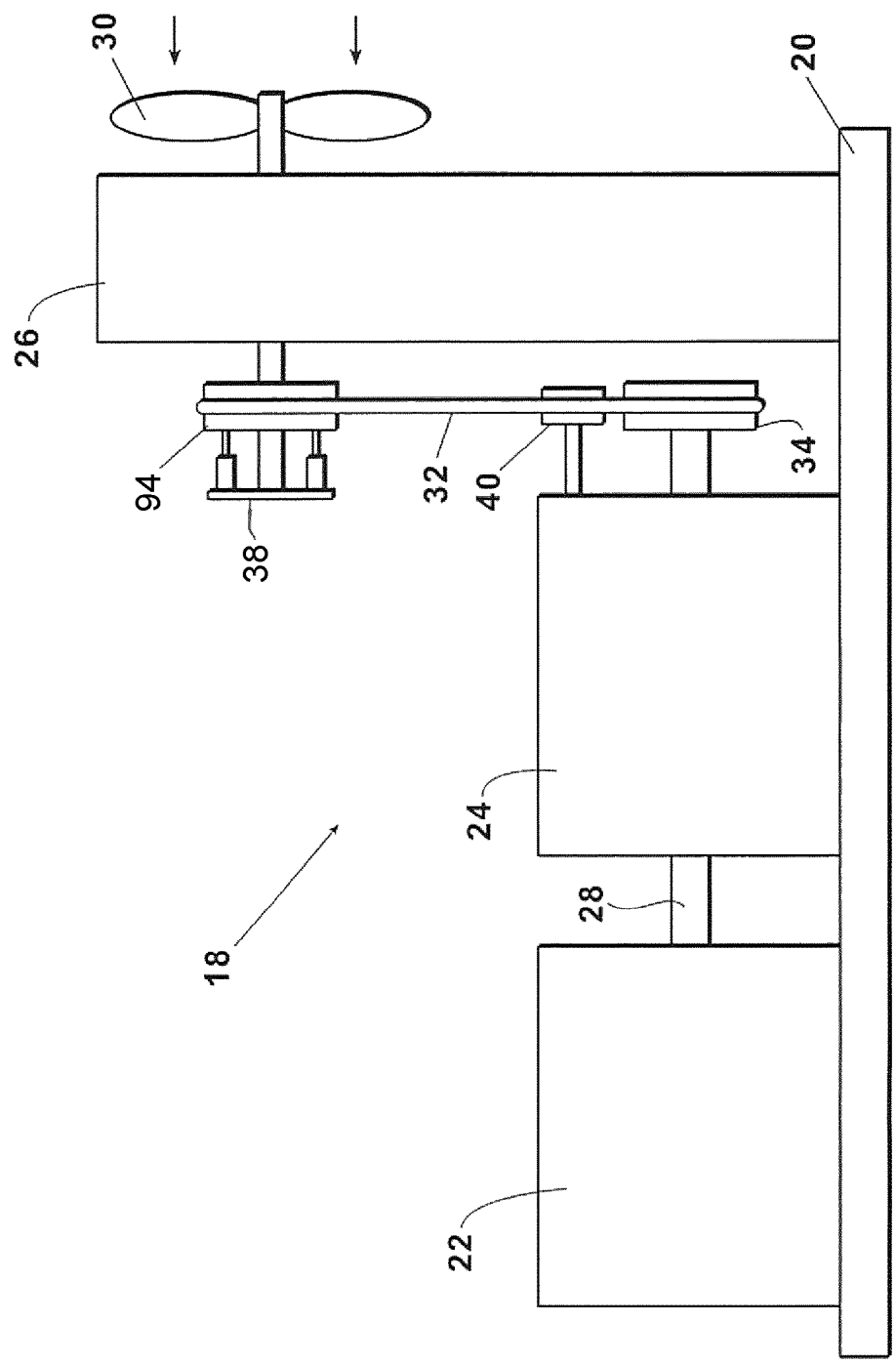
FIG. 1 is a schematic side view of the present invention showing the general layout of the equipment.

Turning now to the drawings wherein like reference characters indicate like or similar parts throughout, FIG. 1 illustrates the general physical layout of the present invention. There is a gas compressor 22, internal combustion engine 24 and fin fan cooler 26 mounted on an equipment skid 20. The compressor 22 is driven by the internal combustion engine 24 via a drive shaft 28. The fan 30 on the fin fan cooler 26 is powered by the internal combustion engine 24 via a drive belt 32. A drive pulley 34 is connected to the crank shaft 36 of the internal combustion engine 24. A magnetic variable speed clutch 38 is connected to the fan 30. The drive belt 32 transfers rotational power from the drive pulley 34 to the magnetic variable speed clutch 38 and to the fan 30. The system may include an idler pulley 40 to remove slack from the drive belt 32 and ensure sufficient tension for efficient transfer of power between the drive pulley 34 and the magnetic variable speed clutch 38.

Figure 2:
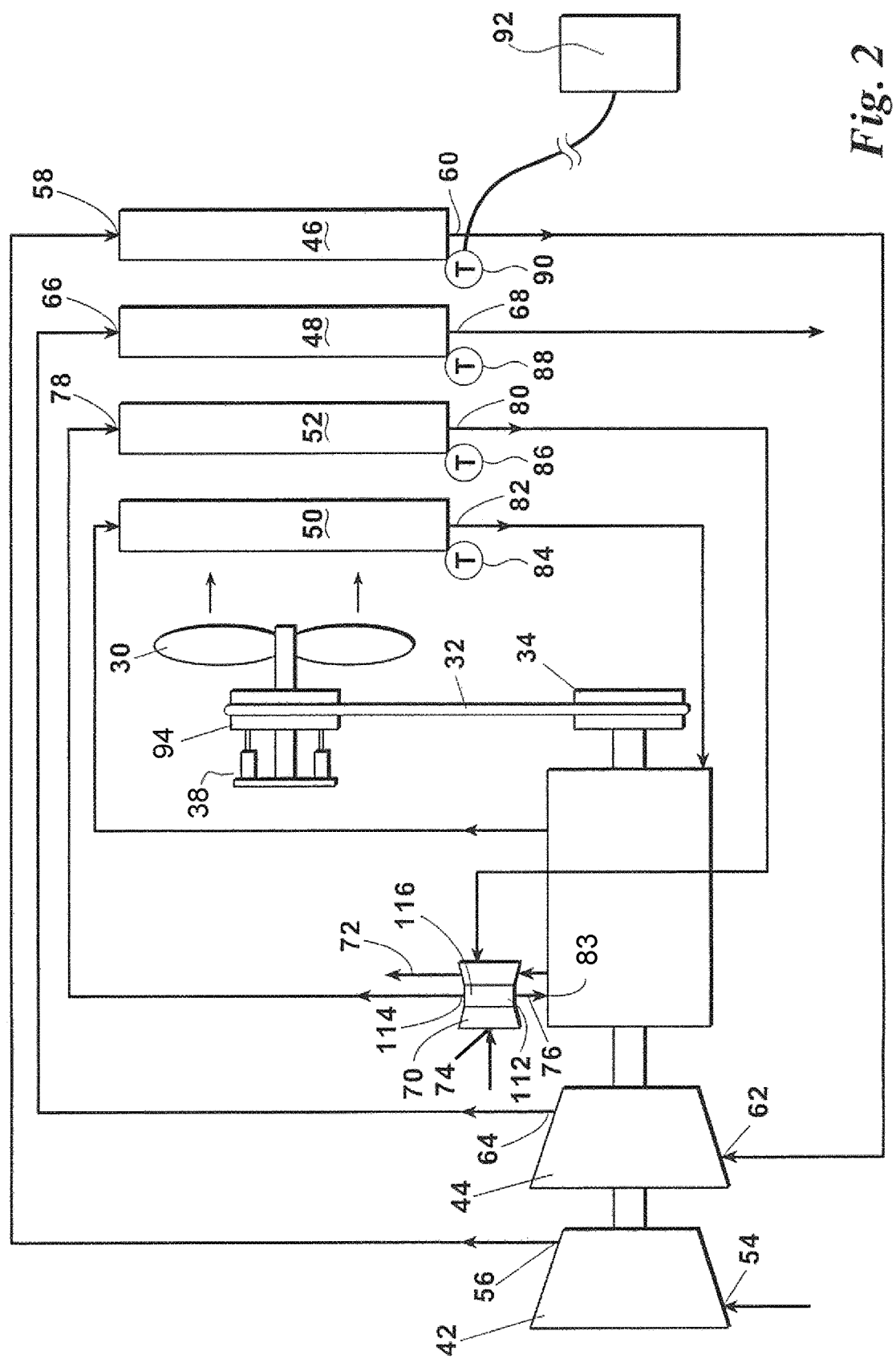
FIG. 2 is a schematic of the present invention showing the flow of gases and cooling liquids.

FIG. 2 is a schematic view that provides the flow of the various gas flows and cooling liquid flows. In the example shown in FIG. 2 there are a first and second compression stages 42 and 44 as well as a first, second, third and fourth cooling stage 46, 48, 50 and 52. It should be under stood the present invention may include additional compression stages and their corresponding additional cooling stages. However for ease of explanation a two stage compression system is used.

Natural gas from a well or other source enters the system 18 through the inlet 54 of the first compression stage 42 where it is compressed. The compressed gas leaves through the first compression stage outlet 56 which is in fluid communication with the first stage cooling inlet 58. Heat is removed from the compressed gas as it passes through the first cooling stage 46. The cooled compressed gas leaves the first cooling stage 46 through the outlet 60 which is in fluid communication with the inlet 62 of the second compression stage 44. The gas is compressed and leaves the second compression stage 44 via the outlet 64 which is in fluid communication with the inlet 66 of the second cooling stage 48. The gas is cooled as it passes through the second cooling stage 48. The gas leaves the second cooling stage 48 via the outlet 68 and passes on to a pipeline or further processing which varies based on the specific installation. Condensate knockout drums and other liquid removal may also be incorporated in the process between the cooling stages and compression stages as necessary.

The third cooling stage 50 of the fin fan cooler 26 is in fluid communication with the cooling system of the internal combustion engine 24. Thus it cools the cooling fluid of the internal combustion engine 24.

The fourth cooling stage 52 in this example, provides cooling fluid for the intercooler 112 of the turbo 70 on the internal combustion engine 24. The turbo 70 is powered by the exhaust 72 leaving the internal combustion engine 24. This is used to pressurize combustion air. The combustion air enters the turbo 70 through the inlet 74. It is pressurized in the turbo 70 and exits through the outlet 76, where it is cooled in the intercooler prior to entering the intake 83 of the internal combustion engine 24. The compressed and cooled combustion air is mixed with fuel and used in the operation of the internal combustion engine 24.

Cooling fluid leaves intercooler 112 via the outlet 114 which is in fluid communication with the inlet 78 of the fourth cooling stage 52 of the fin fan cooler 26. The cooling fluid is cooled and then leaves the fourth cooling stage 52 through the outlet 80 which is in fluid communication with the inlet 116 of the intercooler 112. Many applications of the present invention use a turbo charged engine thus the example includes a turbo 70 and fourth cooling stage 52, used to cool an intercooler 112. However, the present invention may also be used with a normally aspirated engine in which case the intercooler would not be needed.

During operation the fan 30 blows air across the first, second, third and fourth cooling stages 46, 48, 50 and 52. This helps remove heat from the compressed gas, compressed combustion air and cooling fluids flowing through the fin fan heat exchanger 26. Temperature sensors 84, 86, 88 and 90 are located at the outlets 60, 68, 80 and 82 of the various stages. The temperature detected at these points is sent to a controller 92. The connection between the temperature sensors 84, 86, 88, and 90 and the controller 92 can be hardwired or wireless.

If the temperature at any one of these locations exceeds a preset upper limit the speed of the fan 30 is increased through operation of the magnetic variable speed clutch 38. This increase in fan speed and air flow in turn increases the amount of the heat removed from the fluids flowing through the other side of the heat exchanger 26. The fan speed can be stepped up or down incrementally based upon hitting predetermined temperature levels.

Figure 3:
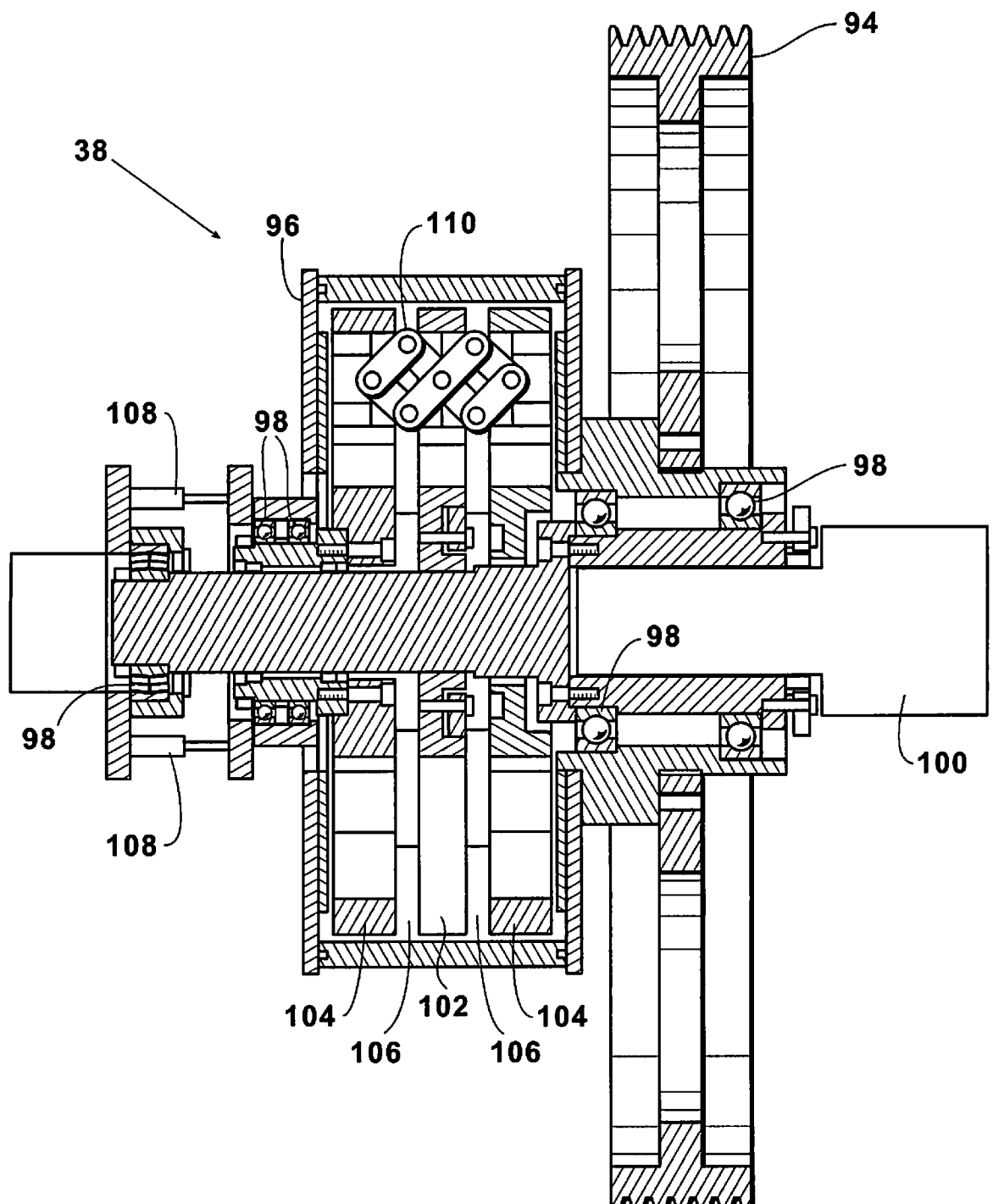
FIG. 3 is a cross section view of the magnetic variable speed clutch.

FIG. 3 provides a cross section view of the magnetic variable speed clutch 38. The clutch 38 has a drive pulley 94 which receives rotational power from the drive belt 32. The drive pulley 94 and disk assembly 96 rotate on a set of bearings 98 about the fan drive shaft 100. A ferrous disk 102 is fixedly coupled to and rotates with the fan drive shaft 100. The disk assembly has a pair of magnetic plates 104 located on either side of the ferrous disk 102. The magnetic plates 104 are fixedly coupled to and rotate with the drive pulley 94. There is a gap 106 between the disk 102 and each plate 104. The disk 102 is attracted to the magnetic field of the plates 104. Thus, as the plates 104 rotate with the drive pulley 94, the disk 102 is attracted to the same rotation. It is this magnetic field which couples the drive pulley 94 to the fan drive shaft 100.

There is a natural slippage between the plates 104 and the disk 102. This slippage can be increased by increasing the gap 106 thus decreasing the fan speed. Conversely the fan speed can be increased by reducing the gap 106 and thus reducing the slip. The gap 106 can be adjusted through operation of the one or more solenoids 108 (adjusting devices). The solenoids 108 are operable by the controller 92. The linkage 110 ensures the gaps 106 on either side of the disk 102 remain equal.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

The invention claimed is:

1. A system for powering a fan heat exchanger said system comprising:
   an equipment skid;
   an internal combustion engine mounted on the equipment skid and an engine cooling system that cools the engine by an engine cooling fluid;
   a compressor mounted on the equipment skid, powered by the internal combustion engine and connectable to a source of gas so that operation of the compressor produces compressed gas;
   a cooler mounted on the equipment skid, the cooler including one cooling stage connected to the engine cooling system to receive the engine cooling fluid and an other cooling stage connected to the compressor to receive the compressed gas, the cooler also including a fan powered by the internal combustion engine via a variable speed electromagnetic drive to direct air flow across the one cooling stage to remove heat from the engine cooling fluid and across the other cooling stage to remove heat from the compressed gas;
   a plurality of temperature sensors including one temperature sensor positioned to determine a temperature of an output of the one cooling stage and an other sensor positioned to determine a temperature of an output of the other cooing stage; and
   at least one adjusting device connected to the variable speed electromagnetic drive and operable in response to the temperature determined by the one sensor and the other sensor to operate the variable speed electromagnetic drive in a way that increases a speed of rotation of the rotating fan when the temperature detected by at least one of the plurality of temperature sensors exceeds a predetermined temperature to thereby increase the speed of rotation of the rotating fan and produce increased air flow across the one cooling stage and the other cooling stage to increase an amount of heat removed from the compressed gas and the engine cooling fluid.

2. The system of claim 1 further comprising:
   a first pulley mounted on the crankshaft of the internal combustion engine;
   a second pulley mounted on the variable speed electromagnetic drive and aligned with the first pulley; and
   a belt interconnecting the first and second pulley and capable of transmitting rotational energy from the first pulley to the second pulley.

3. The system of claim 2
   wherein the compressor comprises at least a first compression stage and a second compression stage for compressing the gas;
   wherein the one cooling stage is a first cooling stage, an output of the first compression stage is in fluid communication with an input of the first cooling stage, the output of the first cooling stage is in fluid communication with an input of the second compression stage and an output of the second compression stage is in fluid communication with an input on a second cooling stage.

4. The system of claim 3 wherein the one temperature sensor is a first temperature sensor and further comprising a second temperature sensor at the output of the second cooling stage;
the adjusting device including one or more electric solenoids operable to adjust the speed of rotation of the fan; and
a controller in electronic communication with the first and second temperature sensors and the one or more solenoids;
wherein when the temperature of the first temperature sensor or the second temperature sensor exceeds the predetermined temperature, the controller controls operation of the one or more electric solenoids to increase the speed of rotation of the fan.

5. The system of claim 4 further comprising:
an idler pulley operable to provide tension in the belt.

6. The system of claim 4 further comprising:
a third cooling stage in the cooler, the other cooling stage being a fourth cooling stage;
wherein the third cooling stage is in fluid communication with an outlet on an intercooler and an inlet of the intercooler, and the fourth cooling stage is in fluid communication with an engine cooling fluid outlet on the internal combustion engine and an engine cooling fluid inlet on the internal combustion engine.

7. The system of claim 1 wherein the adjusting device is an electric solenoid that adjusts the variable speed electromagnetic drive so that the variable speed electromagnetic drive causes the rotating fan to continue rotating, but at a faster or slower speed of rotation.

8. The system of claim 1 wherein the adjusting device is an electric solenoid that adjusts a distance between two plates in the variable speed electromagnetic drive to change the speed of rotation of the rotating fan so that the rotating fan rotates faster or slower.

9. The system of claim 1 wherein the adjusting device is operable to alternatively increase and decrease slippage between two parts of the variable speed electromagnetic drive so that the increase in the slippage causes the rotating fan to continue rotating but at a slower speed of rotation, and the decrease in the slippage causes the rotating fan to continue rotating but at a faster speed of rotation.

10. A method for driving a fan on a skid mounted fan heat exchanger, the method comprising:
directing gas to a compressor provided on an equipment skid and driven by operation of an internal combustion engine, the equipment skid also being provided with a cooler that includes the fan, the internal combustion engine including a cooling system that utilizes a engine cooling fluid to cool the internal combustion engine;
compressing the gas through operation of the compressor to produce compressed gas;
cooling the compressed gas produced by the compressor in a gas cooling stage by air flow produced through rotation of the fan and cooling the engine cooling fluid from the internal combustion engine in a fluid cooling stage by the air flow produced through rotation of the fan, the fan being rotated by operation of the internal combustion engine via a magnetic variable speed clutch;
measuring a temperature of an output of the gas cooling stage and measuring a temperature of an output of the fluid cooling stage; and
increase a speed of rotation of the rotating fan when the temperature measured at the output of the gas cooling stage and/or when the temperature measured at the output of the fluid cooling stage exceeds a predetermined temperature to thereby increase the speed of rotation of the rotating fan and produce increased air flow across the gas cooling stage and the fluid cooling stage to increase an amount of heat removed from the compressed gas and the engine cooling fluid, and
the increase of the speed of rotation of the rotating fan comprising operating at least one adjusting device connected to the variable speed electromagnetic drive to operate the variable speed electromagnetic drive in a way that increases the speed of rotation of the rotating fan.

11. The method of claim 10 further comprising:
providing a belt between a drive pulley on a crank shaft of the internal combustion and the magnetic variable speed clutch.

12. The method of claim 11 further comprising:
measuring the temperature at the output of the gas; and
decreasing the speed of rotation of the rotating fan when the temperature measured at the output of the gas cooling stage drops below a predetermined level.

13. The method of claim 11 further comprising:
a turbo powered by exhaust leaving the internal combustion engine to produce pressurized air, and an intercooler that cools the pressurized air by intercooler cooling fluid, the method further comprising measuring the temperature of the intercooler cooling fluid; and
increasing the speed of rotation of the rotating fan when the measured temperature of the intercooler cooling fluid exceeds a predetermined level.

14. The method of claim 11 further comprising:
a turbo powered by exhaust leaving the internal combustion engine to produce pressurized air, and an intercooler that cools the pressurized air by intercooler cooling fluid, the method further comprising measuring the temperature of the intercooler cooling fluid; and
decreasing the speed of rotation of the rotating fan when the measured temperature of the intercooler cooling fluid drops below a predetermined level.

15. The method of claim 11 further comprising:
decreasing the speed of rotation of the rotating fan when the measured temperature of the engine cooling fluid drops below a predetermined level.

16. The method of claim 11 wherein the at least one adjusting device is an electric solenoid that adjusts the variable speed electromagnetic drive so that the variable speed electromagnetic drive causes the rotating fan to continue rotating, but at a faster or slower speed of rotation.

17. The method of claim 11 wherein the adjusting device is an electric solenoid that adjusts a distance between two plates in the variable speed electromagnetic drive to change the speed of rotation of the rotating fan so that the rotating fan rotates faster or slower.

18. The method of claim 11 wherein the adjusting device alternatively increases and decreases slippage between two parts of the variable speed electromagnetic drive so that the increase in the slippage causes the rotating fan to continue rotating but at a slower speed of rotation, and the decrease in the slippage causes the rotating fan to continue rotating but at a faster speed of rotation.

\* \* \* \* \*